United States Patent
Hayashi

(10) Patent No.: US 11,781,935 B2
(45) Date of Patent: Oct. 10, 2023

(54) HOUSING UNIT

(71) Applicant: MITUTOYO CORPORATION, Kawasaki (JP)

(72) Inventor: Hiroyuki Hayashi, Kanagawa Prefecture (JP)

(73) Assignee: Mitutoyo Corporation, Kawasaki (JP)

( * ) Notice: Subject to any disclaimer, the term of this patent is extended or adjusted under 35 U.S.C. 154(b) by 62 days.

(21) Appl. No.: 17/721,842

(22) Filed: Apr. 15, 2022

(65) Prior Publication Data

US 2022/0334018 A1 Oct. 20, 2022

(30) Foreign Application Priority Data

Apr. 20, 2021 (JP) ................. 2021-071421

(51) Int. Cl.
*G01M 3/16* (2006.01)
*G01B 21/22* (2006.01)

(52) U.S. Cl.
CPC .............. *G01M 3/16* (2013.01); *G01B 21/22* (2013.01)

(58) Field of Classification Search
CPC ................................. G01M 3/16; G01B 21/22
See application file for complete search history.

(56) References Cited

FOREIGN PATENT DOCUMENTS

| CN | 219348093 U | * | 7/2023 |
| JP | 2019-117061 | | 7/2019 |
| WO | WO-2021172773 A1 | * | 9/2021 |

* cited by examiner

*Primary Examiner* — Jamel E Williams
(74) *Attorney, Agent, or Firm* — Rankin, Hill & Clark LLP

(57) ABSTRACT

There is provided a housing unit having an immersion detection function, as a housing of an electronic device requiring waterproofing.

A housing unit includes a casing liquid-tightly defining an internal housing space and housing an internal device in the housing space, and an immersion detector that detects whether liquid leak into the housing space of the casing. The casing includes a sealing means for waterproofing a joint, an entryway, or an opening. The immersion detector includes an electrolyte salt and a continuity detector that detects a change in conductivity when the liquid comes into contact with the electrolyte salt. The electrolyte salt is arranged inside the casing and further inside the casing than the sealing means.

9 Claims, 8 Drawing Sheets

HOUSING UNIT

INCORPORATION BY REFERENCE

This application is based upon and claims the benefit of priority from JP patent application No. 2021-071421, filed on Apr. 20, 2021 (DAS code: E2BD), the disclosure of which is incorporated herein in its entirety by reference.

BACKGROUND OF THE INVENTION

1. Field of the Invention

The present invention relates to a housing unit.

2. Description of Related Art

Sensor devices (for example, rotary encoders) used for drive control of machine tools are often used in a harsh environment where the sensor devices are easily drenched by machining cutting fluid. Such a sensor device (for example, a rotary encoder) has a waterproof structure, but the inside can be immersed due to defect or aging of sealing. Since immersion inside a casing cannot be visually recognized, a user has no choice but to plan maintenance based on the specifications of the sensor device or empirical intuition. In that case, excessive maintenance can result in excessive cost or insufficient maintenance can cause sensor failure or malfunction.

SUMMARY OF THE INVENTION

For example, JP 2019-117061 A proposes forming the cover of a rotary encoder with light-transmissive resin. This allows visual confirmation of whether the inside of the cover is immersed in water.

However, sensor devices, such as rotary encoders, or other control electronic devices are incorporated inside a machine (machine tool) or the like and are hardly visible. Then, checking the condition of such a sensor device requires extensive maintenance work, such as disassembling the machine (machine tool).

In addition, it is difficult to visually check whether there are droplets inside a small sensor device, and the confirmation cannot be perfect despite of careful observation.

A purpose of the present invention is to provide a housing unit having an immersion detection function suitable as a housing of an electronic device requiring waterproofing.

A housing unit according to an exemplary embodiment of the present invention is a housing unit including:
a casing liquid-tightly defining an interior housing space and housing an internal device in the housing space; and
an immersion detector configured to detect whether liquid leak into the housing space of the casing, in which
the casing includes a sealing means for waterproofing a joint, an entryway, or an opening,
the immersion detector includes:
an electrolyte salt; and
a continuity detector configured to detect a change in conductivity when the liquid comes into contact with the electrolyte salt, and
the electrolyte salt is arranged inside the casing and further inside the casing than the sealing means.

In an exemplary embodiment of the present invention, it is preferable that
a recess or a porous body is provided inside the casing and further inside the casing than the sealing means, and
the electrolyte salt is provided in the recess or the porous body.

In an exemplary embodiment of the present invention, it is preferable that
the recess or the porous body is constituted by a plurality of sub-sections separated from each other,
the electrolyte salt is provided in each of the plurality of sub-sections, and
the continuity detector is configured to detect conductivity of each of the plurality of sub-sections.

In an exemplary embodiment of the present invention, it is preferable that
a plurality of rows of the recesses or a plurality of rows of the porous bodies are arranged in a direction from a side closer to the sealing means toward an inside of the casing.

In an exemplary embodiment of the present invention, it is preferable that
a plurality of rows of the recesses or a plurality of rows of the porous bodies are arranged in a direction from a side closer to the sealing means toward an inside of the casing, and
a gap between each adjacent two sub-sections of the plurality of sub-sections in a row close to the sealing means and a gap between each adjacent two sub-sections of the plurality of sub-sections in a row away from the sealing means are not positioned linearly.

In an exemplary embodiment of the present invention, it is preferable that
the continuity detector is configured to perform a continuity detecting operation at fixed intervals or before the internal device operates.

An electronic device according to an exemplary embodiment of the present invention includes:
the housing unit; and
an internal device housed inside the housing unit.

In an exemplary embodiment of the present invention, it is preferable that
the internal device is a sensor module,
the electronic device is a sensor device configured to detect physical displacement of an object to be measured,
the electronic device is incorporated in a drive unit of a machine tool, and
the continuity detector is configured to perform a continuity detecting operation in accordance with an ejection timing of cutting fluid.

A control method of the electronic device according to an exemplary embodiment of the present invention is a control method of the electronic device, the control method includes:
performing, by the continuity detector, a continuity detecting operation in accordance with an ejection timing of cutting fluid, in which
the internal device is a sensor module,
the electronic device is a sensor device configured to detect physical displacement of an object to be measured, and
the electronic device is incorporated in a drive unit of a machine tool.

DETAILED DESCRIPTION

Figure 1:
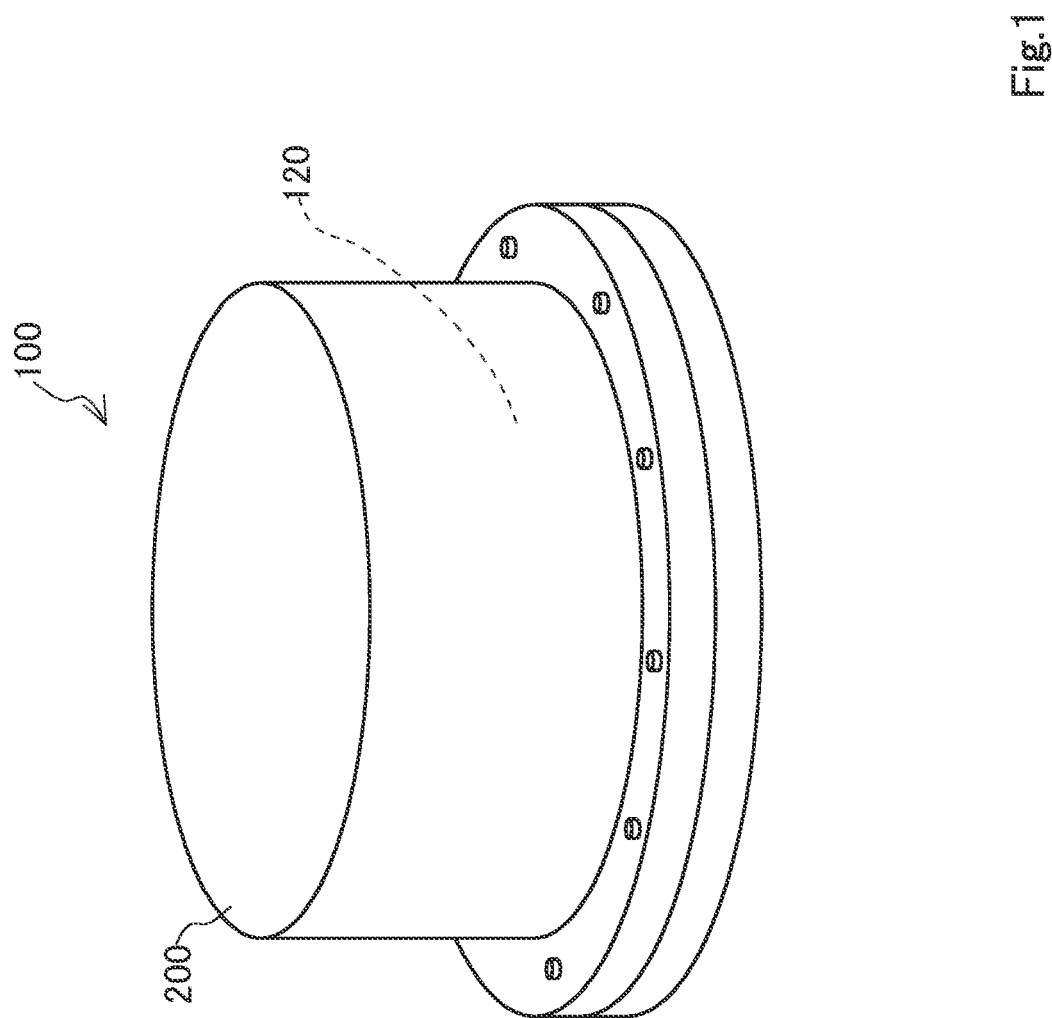
FIG. 1 is a perspective view of an appearance of a rotary encoder.

Embodiments of the present invention are illustrated and described with reference to reference signs attached to the elements in the drawings.

First Exemplary Embodiment

A housing unit according to a first exemplary embodiment of the present invention is described below.

The present exemplary embodiment of the present invention relates to a housing unit of an electronic device requiring waterproofing.

The electronic device is, for example, a rotary encoder that is a sensor device.

The first exemplary embodiment is described using a rotary encoder as an example.

FIG. 1 is a perspective view of an appearance of a rotary encoder 100.

Figure 2:
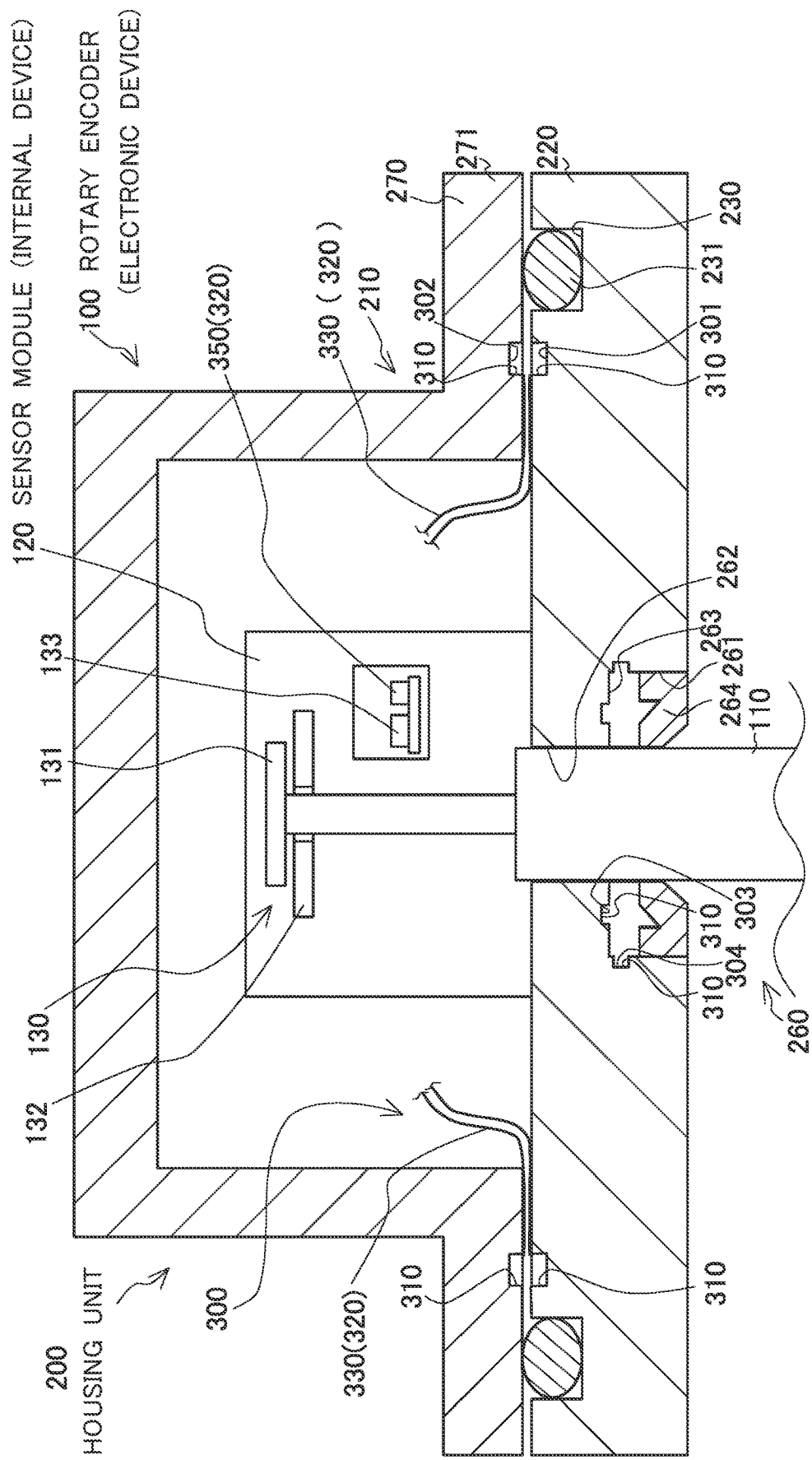
FIG. 2 is a schematic cross-sectional view of the rotary encoder.

FIG. 2 is a schematic cross-sectional view of the rotary encoder 100.

The rotary encoder 100 includes a rotation input shaft 110 (movable body), a sensor module 120 as an internal device, and a housing unit 200 housing the sensor module 120.

In this specification, the rotary encoder 100 is exemplified, and a movable body that is displaced together with an object is the rotation input shaft 110. The tip of the rotation input shaft 110 is connected to an object to be detected (an object to be measured).

The sensor module 120 itself of the rotary encoder 100 is a known one.

The sensor module 120 the rotary encoder 100 is housed inside the housing unit 200 and includes a rotation detector 130 that detects a rotation angle of the rotation input shaft 110.

The rotation detector 130 includes a rotor 131 provided to rotate integrally with the rotation input shaft 110, and a stator 132 that detects the rotation of the rotor 131.

For example, by providing a scale having a periodic pattern on the rotor 131, the detector of the stator 132 detects a change in the scale pattern according to the rotation.

For the detection method, there are known photoelectric, capacitive, and magnetic (electromagnetic induction) types.

The detector of the stator 132 outputs an encoder signal (for example, a sine wave), and the rotation is calculated based on the encoder signal. For this calculation, an operation circuit 133 may be incorporated in the sensor module 120 or provided outside the rotary encoder 100 (outside the housing unit 200).

In this specification, it is assumed that a circuit board is mounted to an electronic unit of the sensor module 120 and that the operation circuit 133 is incorporated in the circuit board.

The housing unit 200 liquid-tightly houses the sensor module 120.

The housing unit 200 includes a casing 210 and an immersion detector 300.

The casing 210 is only required to liquid-tightly define an interior space with a sealing means, and a specific structure thereof is not limited.

In this specification, the casing 210 including a base part 220 and a cap part 270 is exemplified.

Figure 3:
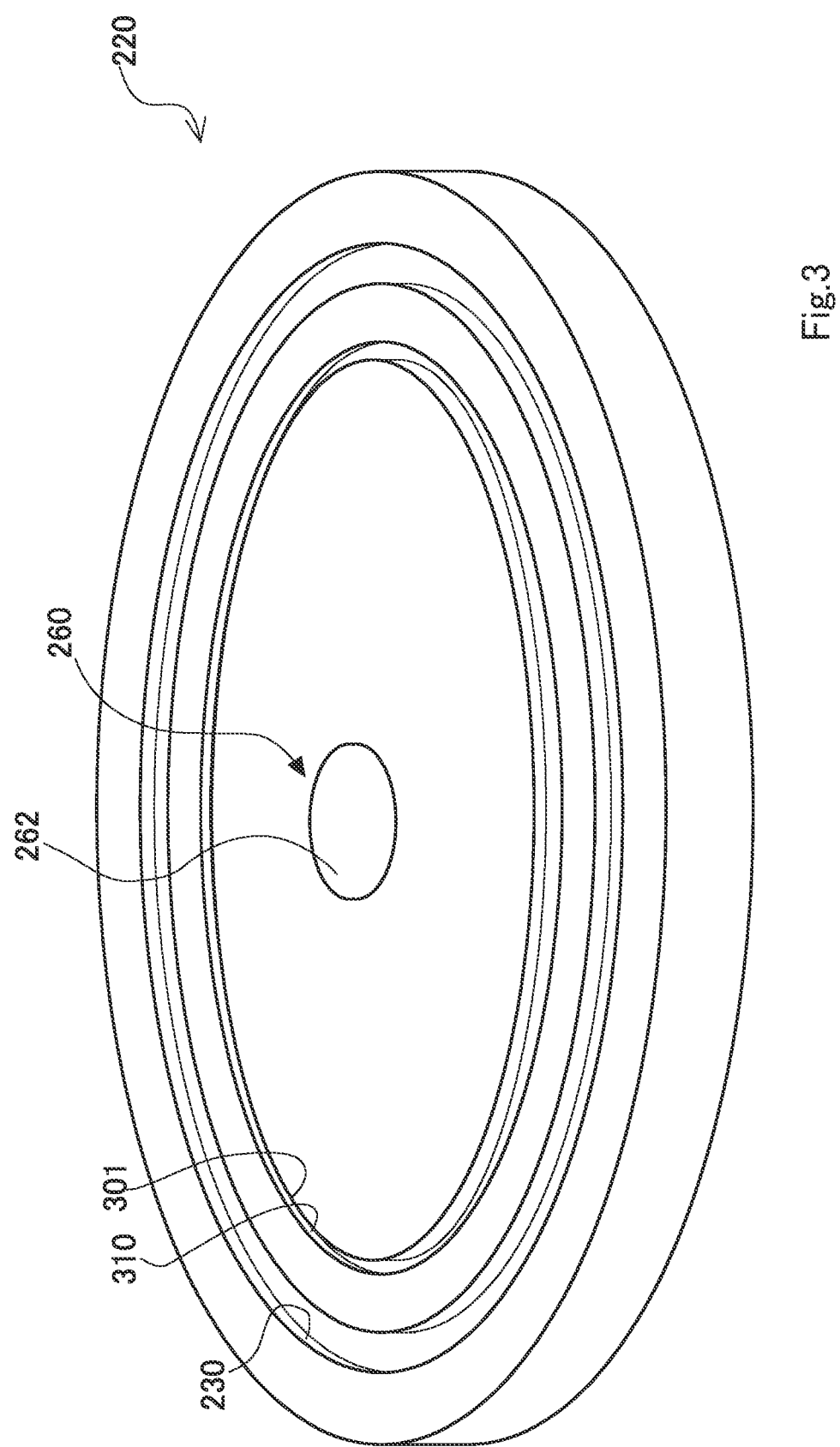
FIG. 3 is a perspective view of a base part.

FIG. 3 is a perspective view of the base part 220.

The base part 220 is a disc-shaped flat plate body.

The cap part 270 has a cylindrical shape with a closed upper end face and an opened lower end face (a cylindrical shape with a top) and includes a flange part 271 radially outwardly extending from the lower end.

Note that, the terms "up" and "low" are used to describe the structure, but these do not limit installation postures (orientations) when the rotary encoder 100 is actually used.

The cap part 270 covers the upper face of the base part 220 to define a housing space between the base part 220 and the cap part 270. At this time, the flange part 271 is brought into contact with the outer edge of the base part 220 with a predetermined area to close the joint between the base part 220 and the cap part 270.

In addition, near the outer edge of the base part 220 on the upper face of the base part 220, a circular sealing groove 230 is provided to completely encircle (surround) the inner side. In this groove, an O ring 231 is fitted as a sealant.

In this specification, the flange part 271 and the O ring 231 constitute a sealing means for liquid-tightly sealing the gap between the base part 220 and the cap part 270, but the sealing means may be, in addition to this, a waterproofing tape sealing the flange part 271 and the base part 220 from the outside. Instead of or in addition to the O ring 231, resin (for example, an adhesive) interposed between the flange part 271 and the base part 220 may be used as the sealing means.

In addition, nearly at the center of the base part 220, an insertion hole 260 through which the rotation input shaft 110 passes.

When the insertion hole 260 is viewed in the direction from the inside of the housing space toward the outside, the insertion hole 260 expands its diameter with a step.

Here, a large diameter portion of the insertion hole 260 closer to the outer side is referred to as a large-diameter hole 261, and a small diameter portion of the insertion hole 260 closer to the inner side is referred to as a small-diameter hole 262. Then, a flat face between the large-diameter hole 261 and the small-diameter hole 262 is referred to as a stepped face 263.

Between the inside wall of large-diameter hole 261 and the rotation input shaft 110, an oil seal 264 (sealing means) is interposed.

The immersion detector 300 includes immersion detecting grooves (recesses) 301 to 304, an electrolyte salt 310, and a continuity detector 320.

The arrangement of the immersion detecting grooves 301 to 304 is described.

On the upper face of the base part 220, a circular groove is provided closer to the inner side of the casing 210 than the sealing groove 230 to encircle (surround) the inner side. This groove is referred to as a first immersion detecting groove 301.

On the lower face of the flange part 271 of the cap part 270, a circular groove is provided closer to the inner side than the position facing the O ring 231 to enclose (surround) the inner side. This groove is referred to as a second immersion detecting groove 302.

Besides, the insertion hole 260 is provided with a third immersion detecting groove 303 and a fourth immersion detecting groove 304.

On the stepped face 263 of the insertion hole 260, a circular groove is provided to encircle (surround) the insertion hole 260. This groove is referred to as the third immersion detecting groove 303.

On the inside wall of the large-diameter hole 261 of the insertion hole 260, a circular groove is provided along the circumferential direction. This groove is referred to as the fourth immersion detecting groove 304.

The electrolyte salt 310 is applied on the inside faces of the first immersion detecting groove 301, the second immersion detecting groove 302, the third immersion detecting groove 303, and the fourth immersion detecting groove 304.

The electrolyte salt 310 may be applied on all the side faces and the bottom faces (the side walls and the bottom faces) of the grooves or only to either of the side faces or the bottom faces of the grooves. The electrolyte salt 310 is, for example, potassium chloride (KCl), sodium chloride (NaCl), potassium hydroxide (KOH), or the like.

In order to apply the electrolyte salt 310 on the inside faces of the grooves 301 to 304, an adhesive resin is applied on the inside faces of the grooves 301 to 304, and then the electrolyte salt 310 may be applied (adhere) thereon. Alternatively, the electrolyte salt 310 is mixed with an adhesive resin, and this resin may be applied on the inside faces of the grooves. After applying the electrolyte salt 310, the resin-applied faces are dried to be completely dehydrated.

The continuity detector 320 includes a pair of two conducting wires 330 and a current detection circuit 350.

Multiple pairs of two conducting wires 330 are prepared and fixed (pasted) to the inside face of a groove while the ends of each pair of two conducting wires 330 are separated from each other.

Each of the separated ends of the conducting wires 330 is referred to as an immersion detection electrode 340.

Figure 4:
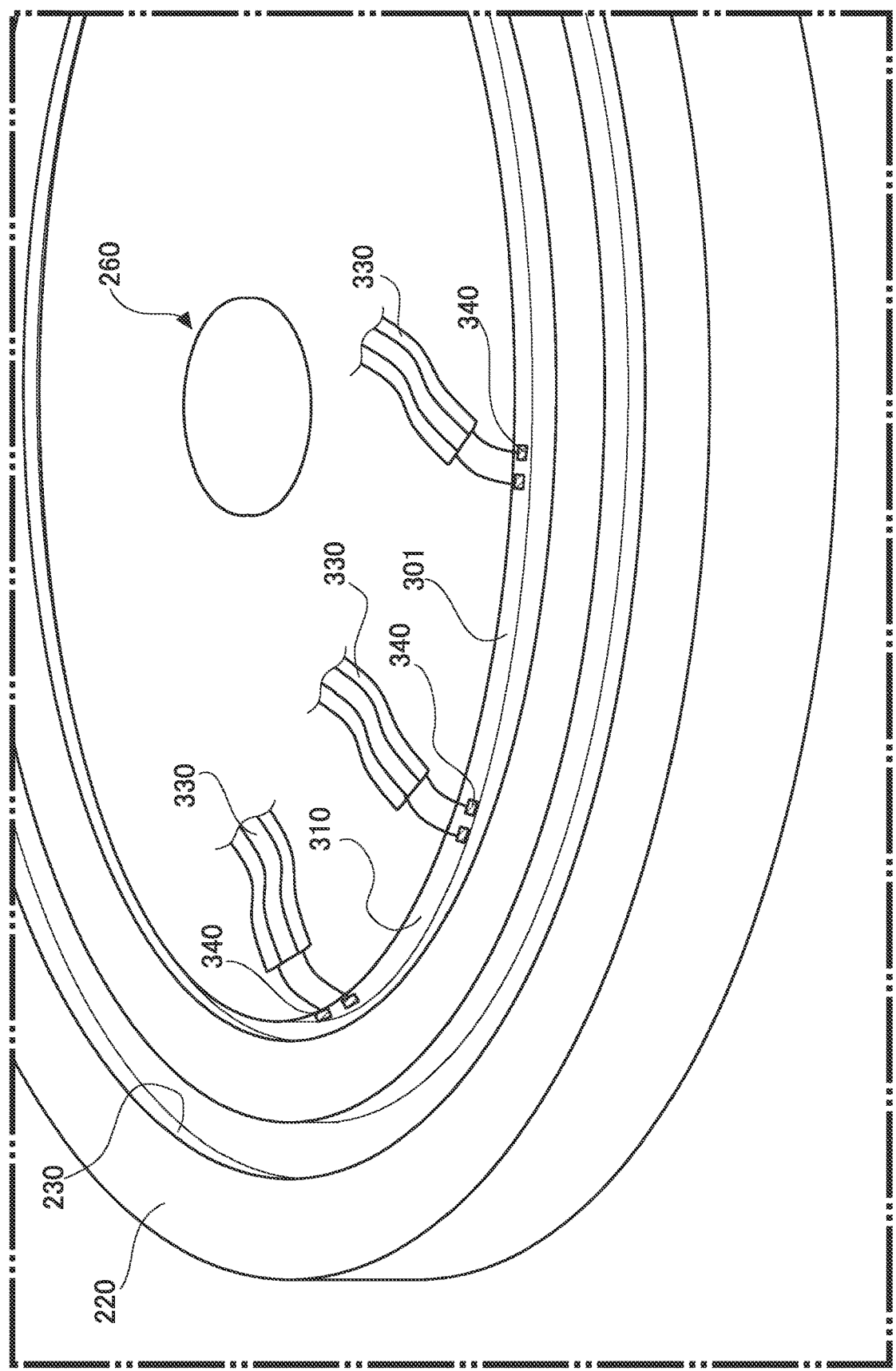
FIG. 4 is a diagram showing that immersion detection electrodes are installed at predetermined positions in a first immersion detecting groove.

Each immersion detection electrode 340 is installed at a position where detection of immersion is desired. FIG. 4 is a diagram showing that the immersion detection electrodes 340 are installed at predetermined positions of the first immersion detecting groove 301.

Note that, if the base part 220 itself or the cap part 270 itself is a conductor, the immersion detection electrodes 340 and the base part 220 or the immersion detection electrodes 340 and the cap part 270 need to be insulated by, for example, interposing an insulator (insulating sheet) therebetween.

The base ends of the conducting wires 330 are connected to the current detection circuit 350.

Note that, although the connection destination of the base ends of the conducting wires 330 is the current detection circuit 350 in this specification, it is only required to detect the continuity of each pair of conducting wires 330, and the base ends of the conducting wires 330 may be connected to a voltage detection circuit.

The current detection circuit 350 may employ a known configuration that can be constituted by a small battery and a simple IC. The current detection circuit 350 is installed at a predetermined position inside the casing 210. In this specification, the current detection circuit 350 is also incorporated in the circuit board inside the sensor module 120.

The immersion detection electrodes 340 can be fixed (pasted) at any positions on the inside face of a groove. If water pools on the bottom face of a groove, it is desirable that the immersion detection electrodes 340 are fixed on the bottom face of the groove. Alternatively, considering that water flows downward, it is desirable that the immersion detection electrodes 340 are installed on a lowest face of a groove according to the installation posture of the rotary encoder 100.

(Immersion Detecting Operation)

The current detection circuit 350 sequentially applies voltage to the immersion detection electrodes 340 at, for example, fixed intervals to check whether the immersion detection electrodes 340 are electrically connected.

If water enters the casing 210 beyond the sealing means, the water flows into the immersion detecting grooves 301, 302, 303, and 304 positioned immediately inside the sealing means. When the water comes into contact with the electrolyte salt 310, electrolytic water is gradually accumulated in the grooves 301, 302, 303, and 304. Then, when the electrolytic water comes into contact with the immersion detection electrodes 340, the immersion detection electrodes 340 are electrically connected with each other. If there is no immersion, ions of the electrolyte salt do not migrate, the conductivity is nearly zero, and the immersion detection electrodes 340 are not electrically connected. On the other hand, if immersion occurs and liquid comes into contact with the electrolyte salt, ions eluted from the electrolyte salt migrate, and the conductivity suddenly increases. That is, detecting a change in the conductivity of the electrolyte salt due to liquid is an immersion detecting operation to detect immersion.

The rotary encoder 100 is, for example, a sensor device incorporated in a drive unit of a machine tool.

A machine tool has a function of ejecting cutting fluid at an appropriately timing. Thus, if the ejection timing of cutting fluid is electrically controlled, a continuity detecting operation (a continuity test and an immersion test) for the immersion detection electrodes 340 may be performed in accordance with the ejection timing of cutting fluid (for example, after a predetermined time (for example, a few seconds) after ejection of cutting fluid).

If there are immersion detection electrodes 340 that are electrically connected over a predetermined threshold, it is determined that the immersion exceeding a permissible value occurs, and the continuity detector 320 may transmit an alarm signal to the outside. The alarm signal is notified to a user by sound or a message, and the occurrence of the alarm is recorded in a predetermined memory (a recording device of an external PC or the like) as a log.

According to the housing unit 200 having the above described configuration in the first exemplary embodiment, by performing a continuity detecting operation (a continuity test and an immersion test) for the immersion detection electrodes 340 at a predetermined timing (after a predetermined time), it is possible to automatically detect whether immersion occurs inside the casing 210, as an immersion detecting operation. Thus, it is possible to perform maintenance of the rotary encoder (electronic device) 100 before the sensor module (internal device) 120 inside the casing 210 fails or malfunctions. Accordingly, it is possible to reduce the man-hours and costs for maintenance and to stably extend the life of the rotary encoder (electronic device) 100.

Second Exemplary Embodiment

In the first exemplary embodiment, each of the immersion detecting grooves 301, 302, 303, and 304 is one continuous circle.

In a second exemplary embodiment, an immersion detecting groove may be divided into a plurality of sub-sections separated from each other. In addition, multiple rows of immersion detecting grooves may be provided from the side closer to the sealing toward the inner side of a casing 210.

Figure 5:
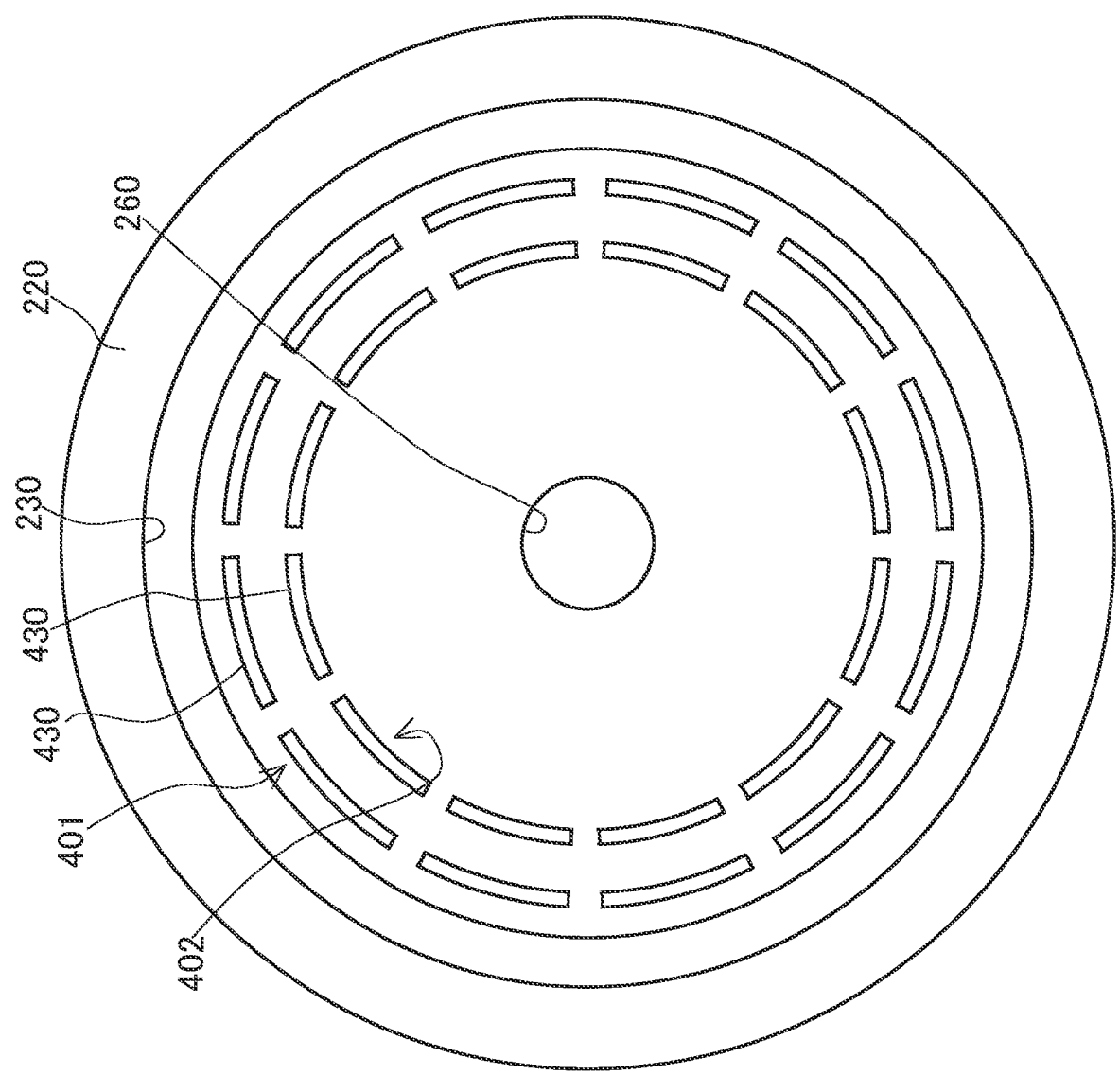
FIG. 5 is a diagram showing an example of arrangement of immersion detecting grooves on the upper face of a base part.
Figure 6:
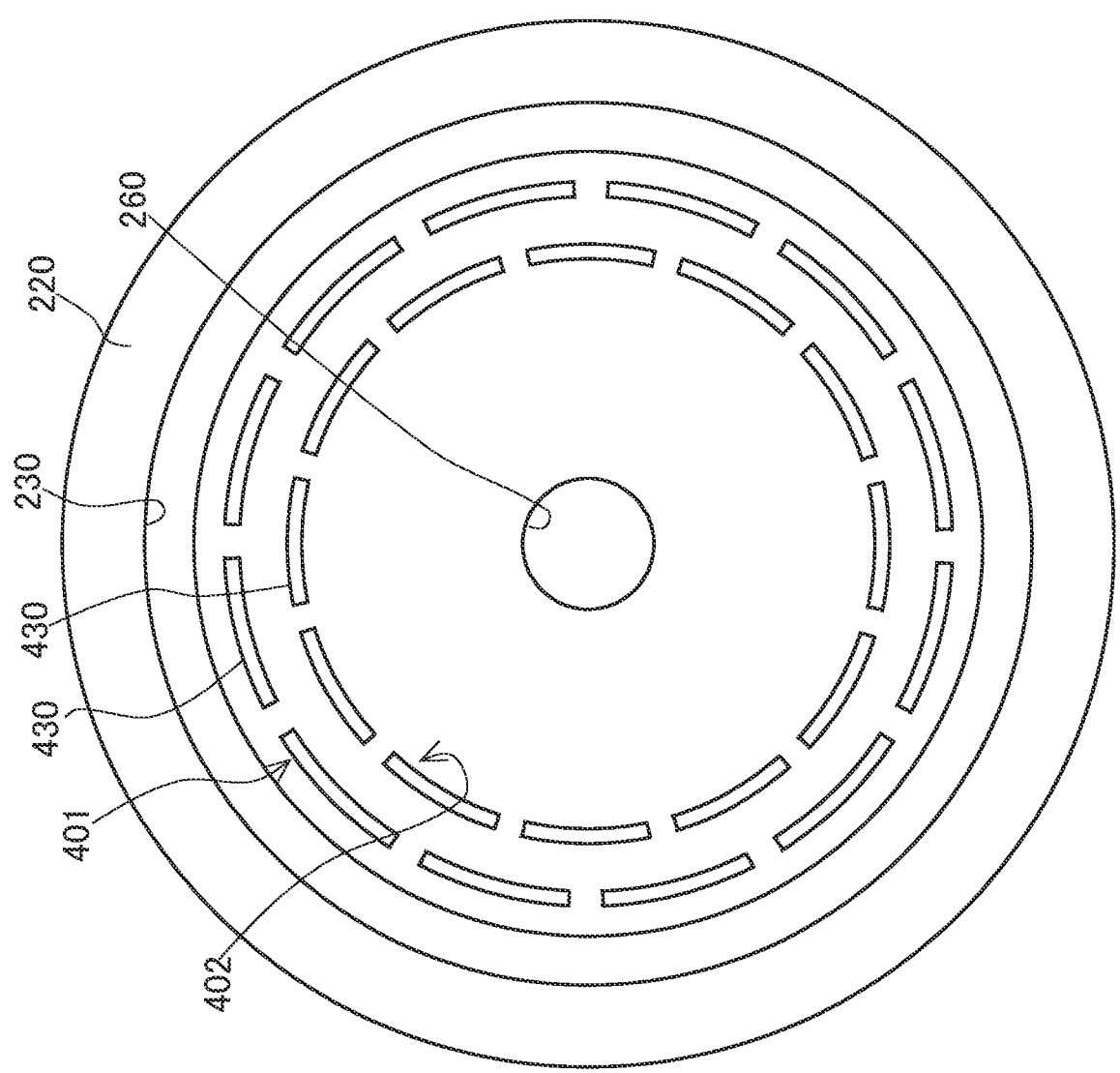
FIG. 6 is a diagram showing an example of arrangement of immersion detecting grooves on the upper face of a base part.

Here, FIGS. 5 and 6 show examples of arrangement of immersion detecting grooves on the upper face of a base part 220. In FIG. 5, two rows of immersion detecting grooves are provided inside a sealing groove 230. Of the two rows of immersion detecting grooves, one closer to the outer side is referred to an immersion detecting groove row 401 in the first row, and the other closer to the inner side is referred to as an immersion detecting groove row 402 in the second row.

Each of the immersion detecting groove row 401 in the first row and the immersion detecting groove row 402 in the second row is divided into a plurality of sub-sections 430. To each sub-section 430, an electrolyte salt 310 is applied, an immersion detection electrode 340 is arranged. Note that, in FIGS. 5 and 6, conducting wires 330 (immersion detection electrodes 340) are omitted.

In FIG. 5, regarding the size of each sub-section 430, the sub-sections 430 constituting the immersion detecting groove row 401 in the first row have a relatively large size compared with the sub-sections 430 constituting the immersion detecting groove row 402 in the second row. Assuming that the amount of water required to detect continuity is related to the size of a sub-section 430 to some extent, the immersion detection in the first row can be set to be slightly dull, and the immersion detection in the second row can be set to be sharp.

In FIG. 5, the gaps between adjacent sub-sections 430 in the first row and the gaps between adjacent sub-sections 430 in the second row are positioned linearly. In contrast, as exemplified in FIG. 6, for example, the gaps between adjacent sub-sections 430 in the first row and the gaps between adjacent sub-sections 430 in the second row may not be positioned linearly, That is, if a virtual straight line is drawn through the gap between each adjacent sub-sections 430 in the first row, this virtual straight line crosses the sub-section 430 in the second row.

Figure 7:
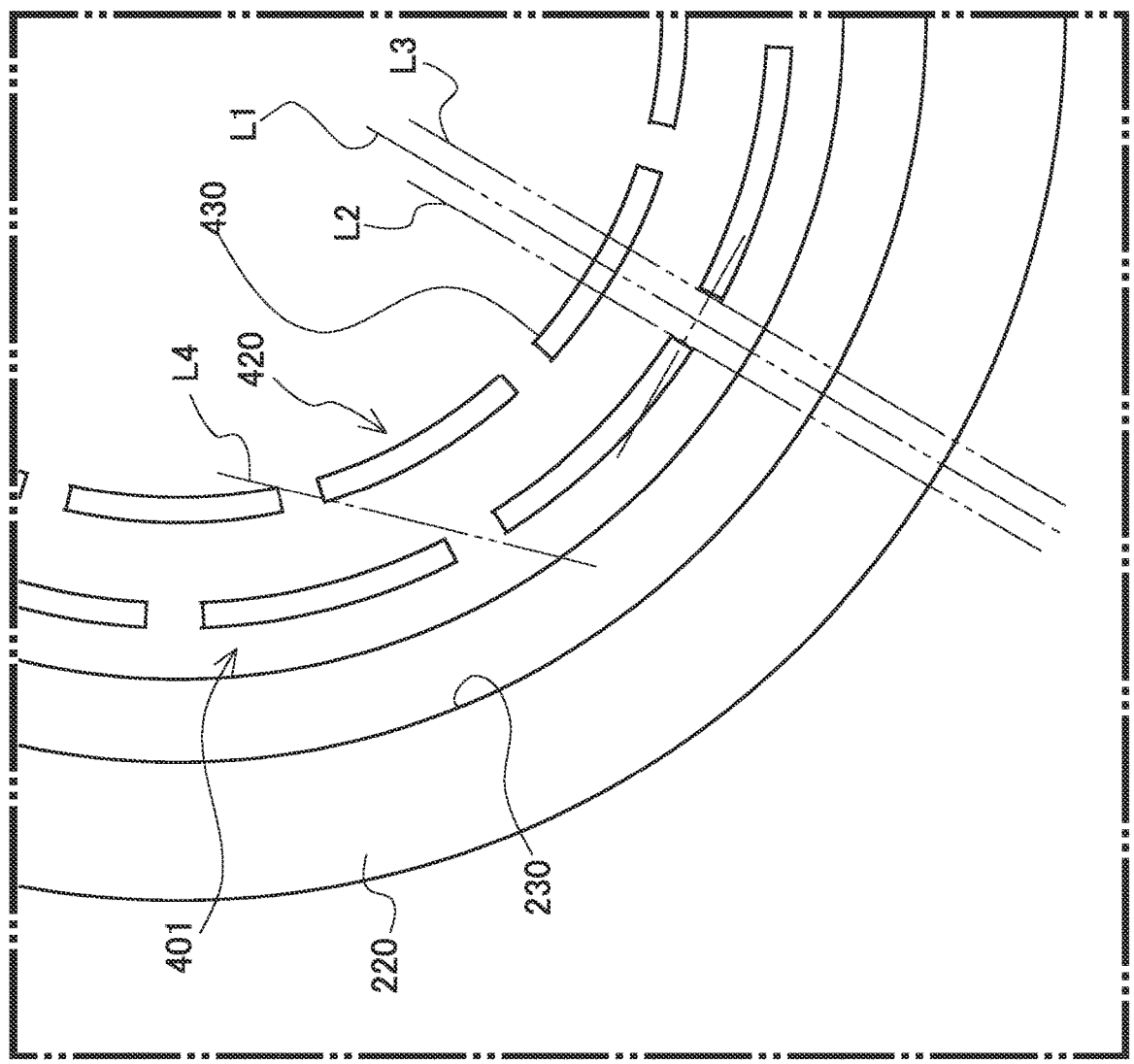
FIG. 7 is an enlarged view of FIG. 6.

FIG. 7 is an enlarged view of FIG. 6.

Here, when a bisector L1 is drawn through the gap between two adjacent sub-sections 430 in the first row, the bisector L1 crosses a sub-section 430 in the second row. In addition, when virtual straight lines L2 and L3 are drawn through the gap between the two adjacent sub-sections 430 in the first row to be parallel to the bisector L1, the virtual straight lines L2 and L3 also cross the sub-section 430 in the second row.

Alternatively, when a virtual straight line L4 is drawn to connect the gap between two adjacent sub-sections 430 in the first row with the gap between two adjacent sub-sections 430 in the second row, the virtual straight line L4 crosses a sub-section 430.

Accordingly, if droplets enter through the gaps of the sub-sections 430 in the first row, these droplets are expected to flow into the sub-sections 430 in the second row and come into contact with the electrolyte salt 310.

In the second exemplary embodiment, the immersion detecting groove rows 401 and 402 in multiple rows each have a plurality of sub-sections 430. An immersion detecting operation is to perform a continuity detecting operation (a continuity test and an immersion test) for the immersion detection electrodes 340 at fixed intervals or at a predetermined timing similarly to the first exemplary embodiment, but determination can be more finely performed by combining a position where immersion is detected and an immersion level.

For example, it is assumed that a first level alarm is generated when immersion is detected at a sub-section 430 in the first row and that a second level alarm is generated when immersion is detected at a sub-section 430 in the second row. In addition, even when immersion is detected at a sub-section 430 in the second row, it is desirable that multiple thresholds for current levels are set to generate alarm information at multiple levels such as low, intermediate, and high levels.

It is necessary for a user to be aware of a first level alarm and pay attention to it, but the user may determine that the rotary encoder 100 does not need to be replaced or overhauled.

It is desirable for a user to check alarm logs for the number of first and second level alarms or the types of the alarms to plan when to replace the rotary encoder 100.

Since a sensor devices, such as the rotary encoder 100, assumed to be used in a harsh environment is provided with measures (protective materials, water repellents, robust detection algorithms, and the like) to prepare immersion to some extent, it can be better to continue using the sensor device until prescribed immersion occurs rather than overhaul or perform maintenance. However, an electronic device for a sensor, such as the rotary encoder 100, has had no function of automatically detecting immersion and recording the immersion level in a log in the past, and a user has no choice but to plan maintenance based on the specifications of the sensor device or empirical intuition. In that case, excessive maintenance can result in excessive cost or insufficient maintenance can cause sensor failure or malfunction, but it is difficult to properly modify maintenance plans under the circumstance where there is no detailed immersion logs.

In this regard, according to the present exemplary embodiment, it is possible to automatically electrically detect immersion and to record, in logs, immersion levels that do not require replacement of a sensor device. Accordingly, it is possible to appropriately perform maintenance depending on the use condition of individual sensor devices (the rotary encoder 100).

Third Exemplary Embodiment

In the first and second exemplary embodiments, the electrolyte salt 310 is arranged in (applied to) the immersion detecting grooves 301 to 304. However, instead of arranging the electrolyte salt 310 in the grooves (recesses) 301 to 304, a porous body 510 may be used.

The porous body 510 is, for example, formed resin (for example, polyurethane resin or the like). The electrolyte salt 310 is arranged in the porous body 510, and the porous body 510 is arranged inside a sealing means. Then, an immersion detection electrode 340 is attached to the porous body 510.

In order for the porous body 510 to support the electrolyte salt 310, the porous body 510 impregnated with the electrolyte salt 310 is dried. Alternatively, the porous body 510 may be impregnated or covered with an adhesive resin, and the electrolyte salt 310 may be applied (adhere) thereto. Alternatively, the electrolyte salt 310 is mixed with an adhesive resin, and the porous body 510 may be impregnated with this resin. The electrolyte salt 310 is dried to be completely dehydrated.

Figure 8:
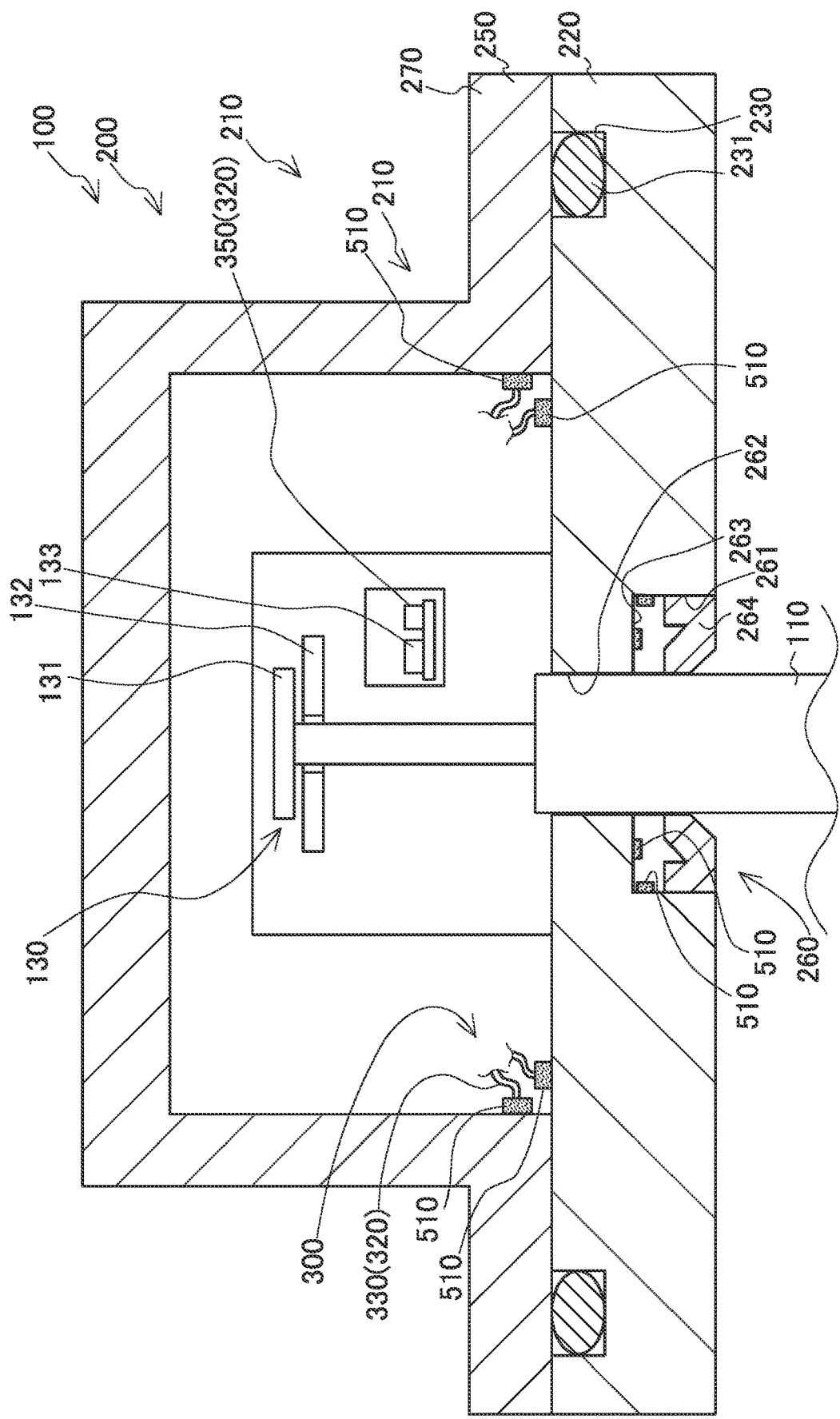
FIG. 8 is a diagram showing, as an example, that a porous body supporting an electrolyte salt is placed inside a casing.

For example, FIG. 8 exemplifies that the porous body 510 supporting the electrolyte salt 310 is arranged inside a casing 210. The porous body 510 is arranged inside an O ring 231 and an oil seal 264, and the immersion detection electrode 340 is attached thereto. In accordance with the points described in the second exemplary embodiment, multiple rows of porous bodies may be arranged, a porous body may be divided into sub-sections, or the size of a porous body (sub-sections) may be changed.

If the electrolyte salt 310 is arranged in a groove (recess), the casing 210 of the rotary encoder 100 needs to be machined to form the groove, but the porous body 510 can be easily added to an existing rotary encoder 100. In addition, by attaching the porous body 510 at a necessary position according to the condition where the rotary encoder 100 is used (installation posture), it is possible to change an immersion detection position depending on a user's needs.

Note that, the present invention is not limited to the above exemplary embodiments and can be changed without deviating from the scope.

In the above exemplary embodiments, the rotary encoder 100 is exemplified, but a sensor device (electronic device) is not limited to the rotary encoder 100 and may be a linear encoder.

In addition, in the above exemplary embodiments, the rotation input shaft 110 is provided to penetrate the base part 220, but the rotation input shaft 110 may be provided to penetrate the cap part 270.

In addition, in the above exemplary embodiments, a sensor device that detects physical displacement of an object to be measured is exemplified, but the present invention may be applied to a motor (actuator) that causes physical displacement of an object to be driven.

The housing unit according to the exemplary embodiments of the present invention is not limited to an encoder or an actuator and is applicable to a housing of any electronic device that needs waterproofing.

In the exemplary embodiments, in order to perform a continuity detecting operation (a continuity test and an immersion test), by applying voltage to immersion detection electrodes to check whether the immersion detection electrodes are electrically connected. However, if different kinds of electrodes (for example, zinc and copper) are used, the immersion detection electrodes themselves serve as batteries, and it is not necessary to separately apply voltage at fixed intervals or a predetermined timing for a continuity detecting operation (a continuity test and an immersion test). Thus, it is possible to perform an immersion test when immersion occurs with nearly zero additional consumption energy. Note that, it is desirable that the areas of the electrodes are increased to some extent.

100 rotary encoder (electronic device, sensor device)
110 rotation input shaft
120 sensor module (internal device)
130 rotation detector
131 rotor
132 stator
133 operation circuit
200 housing unit
210 casing
220 base part
230 sealing groove
231 O ring
260 insertion hole
261 large-diameter hole
262 small-diameter hole
263 stepped face
264 oil seal
270 cap part
271 flange part
300 immersion detector
301 first immersion detecting groove
302 second immersion detecting groove
303 third immersion detecting groove
304 fourth immersion detecting groove
310 electrolyte salt
320 continuity detector
330 conducting wire
340 immersion detection electrode
350 current detection circuit
401 immersion detecting groove row in first row
402 immersion detecting groove row in second row
430 sub-section
510 porous body

The invention claimed is:

1. A housing unit comprising:
a casing liquid-tightly defining an interior housing space and housing an internal device in the housing space; and
an immersion detector configured to detect whether liquid leak into the housing space of the casing, wherein
the casing includes a sealing means for waterproofing a joint, an entryway, or an opening,
the immersion detector includes:
an electrolyte salt; and
a continuity detector configured to detect a change in conductivity when the liquid comes into contact with the electrolyte salt, and
the electrolyte salt is arranged inside the casing and further inside the casing than the sealing means.

2. The housing unit according to claim 1, wherein
a recess or a porous body is provided inside the casing and further inside the casing than the sealing means, and
the electrolyte salt is provided in the recess or the porous body.

3. The housing unit according to claim 2, wherein
the recess or the porous body is constituted by a plurality of sub-sections separated from each other,
the electrolyte salt is provided in each of the plurality of sub-sections, and
the continuity detector is configured to detect conductivity of each of the plurality of sub-sections.

4. The housing unit according to claim 2, wherein
a plurality of rows of the recesses or a plurality of rows of the porous bodies are arranged in a direction from a side closer to the sealing means toward an inside of the casing.

5. The housing unit according to claim 3, wherein
a plurality of rows of the recesses or a plurality of rows of the porous bodies are arranged in a direction from a side closer to the sealing means toward an inside of the casing, and
a gap between each adjacent two sub-sections of the plurality of sub-sections in a row close to the sealing means and a gap between each adjacent two sub-sections of the plurality of sub-sections in a row away from the sealing means are not positioned linearly.

6. The housing unit according to claim 1, wherein
the continuity detector is configured to perform a continuity detecting operation at fixed intervals or before the internal device operates.

7. An electronic device comprising
the housing unit according to claim 1; and
an internal device housed inside the housing unit.

8. The electronic device according to claim 7, wherein
the internal device is a sensor module, the electronic device is a sensor device configured to detect physical displacement of an object to be measured, the electronic device is incorporated in a drive unit of a machine tool, and the continuity detector is configured to perform a continuity detecting operation in accordance with an ejection timing of cutting fluid.

9. A control method of the electronic device according to claim 7, the control method comprising:

performing, by the continuity detector, a continuity detecting operation in accordance with an ejection timing of cutting fluid, wherein the internal device is a sensor module, the electronic device is a sensor device configured to detect physical displacement of an object to be measured, and the electronic device is incorporated in a drive unit of a machine tool.

* * * * *